Dec. 3, 1963 C. G. SÖDERBAUM 3,113,181

AMPLIFIER ARRANGEMENT

Filed Nov. 10, 1961

INVENTOR
CARL GUSTAF SÖDERBAUM
BY Hane and Nydick
ATTORNEYS

United States Patent Office 3,113,181

Patented Dec. 3, 1963

3,113,181
AMPLIFIER ARRANGEMENT

Carl Gustaf Söderbaum, Stockholm, Sweden, assignor to Telefonaktiebolaget LM Ericsson, Stockholm, Sweden, a corporation of Sweden Filed Nov. 10, 1961, Ser. No. 151,519
Claims priority, application Sweden Nov. 25, 1960
1 Claim. (Cl. 179—1)

Figure 1:
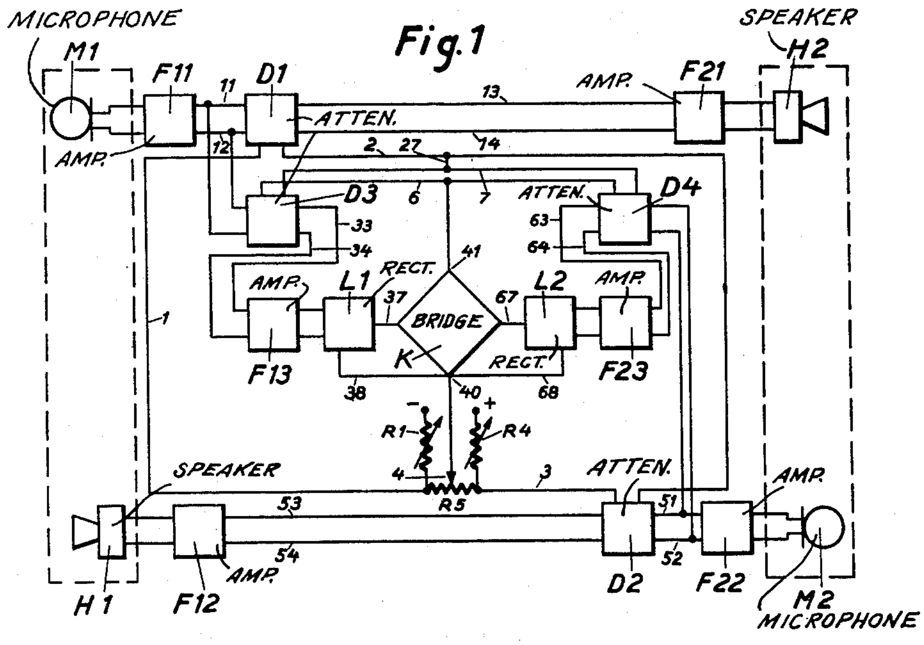

The present invention refers to an amplifier arrangement for a loud speaking telephone, comprising a first amplifier for amplification of outgoing talking currents coming from a microphone, a second amplifier for amplification of incoming talking currents intended for a loud speaker, a first attenuation circuit influencing an amplification of said outgoing talking currents and strongly attenuating during the working condition of the second amplifier, that is when the second amplifier is supplied with talking currents on the input side, a second attenuation circuit influencing an amplification of said incoming talking currents and strongly attenuating during the working condition of the first amplifier, that is when the first amplifier is supplied with talking currents on the input side, a third attenuation circuit connected in parallel to the input side of the first attenuation circuit, which third attenuation circuit during the rest condition of the second amplifier is not much attenuating, that is when the second amplifier is free from talking currents on the input side, a fourth attenuation circuit parallelly connected to the input side of the second attenuation circuit, which fourth attenuation circuit during the rest condition of the first amplifier is not much attenuating, that is when the first amplifier is free from talking currents on the input side, at which said first attenuation circuit and said second attenuation circuit are among themselves like and arranged to pass from being strongly attenuating to be less strongly attenuating when non-linear elements included therein are traversed by a current and said third attenuation circuit and said fourth attenuation circuit are among themselves like and arranged to pass from being more attenuating to be less strongly attenuating when non-linear elements included therein are traversed by a current, and a control bridge, which is arranged to generate a current dependent on voltages fed to it by the third and the fourth attenuation circuit.

The purpose of the invention is to effect respectively an automatic amplification control of outgoing and incoming talking currents, which control is not dependent on the quality of the transistors to present a variable current permeability at small changes of temperature in the surroundings, to make a rapid and to the utmost possible extent non-noticeable changing-over of the transmission direction through the amplifier arrangement, and to easier make a breaking-in of a call in progress possible and hereby diminish the impression that the call should be speech controlled.

An amplifier arrangement shaped according to the invention is characterized by a close current circuit comprising a close current source with high inner resistance, which circuit is connected in series with the non-linear elements of the first attenuation circuit and the second attenuation circuit and is consequently arranged to feed the same close current to said non-linear elements, and by a working current circuit comprising two line branches, which are connected in series with the non-linear elements of the third attenuation circuit and the fourth attenuation circuit, at which one of said line branches is connected to a diagonal point of the said control bridge, the diagonal point of which opposite to the mentioned diagonal point is connected to an electrically symmetrical point of the said inner resistance, and the remaining line branch is connected to a point, which in relation to said inner resistance is symmetrical in the close current circuit.

Figure 2:
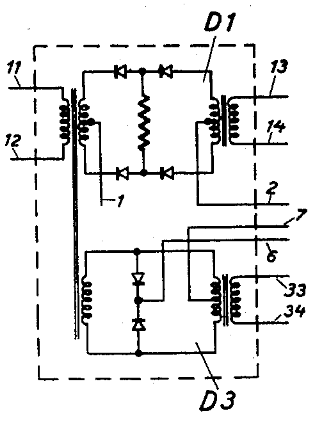
Figure 3:
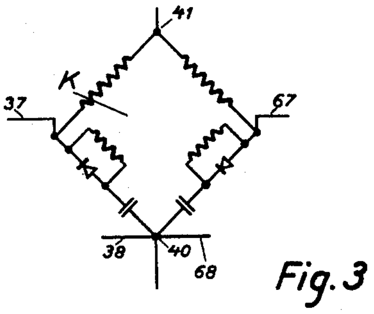
Figure 4:
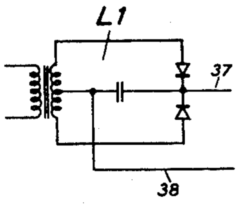

The invention will be further described in connection with the attached drawing, where FIG. 1 shows a block-diagram of an amplifier arrangement according to the invention, FIG. 2 shows a somewhat modified form of two attenuation circuits included in the amplifier arrangement according to FIG. 1, and FIGS. 3 and 4 show respectively a control bridge and a rectifier circuit, which also are integral parts of the arrangement according to FIG. 1.

Speech currents generated by speech in a microphone M are amplified in a first amplifier F11 and are supplied to a loud speaker H2 through a line 11—12, a first attenuation circuit D1, a line 13—14 and a terminal repeater F21. The attenuation circuit D1, see FIG. 2, comprises four rectifiers connected in two circuits of two rectifiers in series with each other between an input transformer and an output transformer, and a resistance connecting the centers of the series connections of the rectifiers. The attenuation circuit D1 during the rest condition of the amplifier arrangement is attenuating to a certain extent, about 25 db, that is when speech transmission does not occur in any direction owing to the fact that said rectifiers are traversed by a certain close current from a close current circuit 1—2—3 including a close current source 4 with a high inner resistance R5. This close current has conductors 1 and 2 connected to the centers of the windings of the two transformers in the attenuating circuit. The close current is so adjusted that a mixinum close amplification is obtained without any risk of acoustic feed-back coupling in the arrangement. When a speech transmission occurs from M1 to H2 the attenuation circuit D1 is not much attenuating owing to the fact that the rectifiers are now traversed by a regulating current, which is essentially larger than said close current. When the speech transmission through the arrangement is in opposite direction from a second microphone M2 to a second loud speaker H1 the attenuation circuit D1 is strongly attenuating, about 50 db, owing to the fact that the rectifiers are now traversed by a current which is essentially less than the said close current. How this is achieved will be further described below.

To the output side of the amplifier F11 a third attenuation circuit D3 is also connected, which circuit during the rest condition of the amplifier arrangement or during the speech transmission from M1 to H2 is not much attenuating. The input transformers of the two attenuation circuits D1 and D3 have a common primary winding, and circuit D3 comprises two towards each oppositely connected rectifiers connected across the secondary winding of the input transformer and the primary winding of an output transformer. When the speech transmission through the arrangement is from the microphone M2 to the loud speaker H1 the attenuation circuit D3 is strongly attenuating owing to the fact that the rectifiers in this circuit are now traversed by substantial regulating current through the conductor branches 6 and 7 in a working current circuit, which will be further described below. The output transformer of the attenuation circuit D3 is connected through a line 33—34 to an amplifier F13, which in turn is connected to a rectifier circuit L1, see FIG. 4, for rectification of alternating voltage fed to the same. The rectified voltage is fed through conductors 37 and 38 to a branch of a control bridge K, see FIG. 3, which in a known way is so arranged that the magnitude and the direction of a regulating current taken from the same is dependent of a voltage fed to the same. When a rectified voltage is fed through the conductors 37 and 38 the upper corner point 41 of the control bridge obtains a positive potential and its lower corner point 40 obtains a negative potential with respect to point 41. The corner point 40 is connected to a point which is electrically symmetrical on the resistance R5.

The rectifier arrangement is symmetric, and therefore the components for the speech transmission from M2 to H1 can be quite summarily mentioned. Speech currents generated by speech in the microphone M2 are amplified in a second amplifier F22 and are supplied to the loud speaker H1 through a line 51—52, a second attenuation circuit D2, which is arranged in the same way as the attenuation circuit D1, a line 53—54 and a terminal amplifier F12. The attenuation circuit D2 is during the rest condition of the amplifier arrangement attenuating to a certain extent, about 25 db, and during a speech transmission from M2 to H1 not much attenuating but during speech from M1 to H2 strongly attenuating, about 50 db. To the output side of the amplifier F22 a fourth attenuation circuit D4 is connected, which is arranged in the same way as the attenuation circuit D3. When the speech transmission through the arrangement is from the microphone M1 to the loud speaker H2 the attenuation circuit D4 is strongly attenuating owing to a regulating current through the conductor branches 6 and 7. The output transformer of the attenuation circuit D4 is through a line 63—64 connected to an amplifier F23, which in turn is connected to a rectifier circuit L2, which is arranged in the same way as the rectifier circuit L1. The rectified voltage of the rectifier circuit L2 is fed through conductors 67—68 to the already mentioned branch of the control bridge K. When a rectified voltage is fed through the conductors 67 and 68 the upper corner point 41 of the control bridge obtains a negative potential and its lower corner point 40 obtains a positive potential with respect to point 41.

The close current circuit 1—2—3 and source 4 mentioned in the foregoing is consequently connected in series with the first attenuation circuit D1 and the rectifier (non-linear elements) of the second attenuation circuit D2 and thus arranged to feed the same close current to said rectifiers from the close current source.

The working current circuit 6—7 mentioned in the foregoing is consequently connected in series with the non-linear elements of the third attenuation circuit D3 and the fourth attenuation circuit D4 connected by the line branch 6 of the working current circuit to the upper corner point 41 of the control bridge K and by the line branch 7 and a connection 27 to resistance R5 in the close current circuit 1—2—3.

The amplifier arrangement now described in detail functions in the following way: In the rest condition the attenuation circuit D1 and D2 are attenuating to a certain extent, for instance 25 db since their rectifiers are traversed by a certain rest current through the close current circuit 1—2—3 and source 4; the attenuation circuits D3 and D4 are somewhat attenuating as their rectifiers are not traversed by any regulating current. Upon speech transmission from M1 to H2, part of the speech energy is conducted to the attenuation circuit D3, amplified in the amplifier F13 and rectified in the rectifier bridge L1. The rectified voltage is fed to the control bridge K and causes the point 40 to have negative potential and the point 41 to have positive potential. Hereby a regulating current is generated through the following circuit: the point 41—the rectifiers in D4—the connection 27 between the conductor 7 and the conductor 2—the rectifiers in the attenuation circuit D1—the conductor 1—part of R5—the point 40. This regulating current causes the attenuation circuit D1 not to be much attenuating, the attenuation circuit D4 to be strongly attenuating and also the attenuation circuit D2 to be strongly attenuating as the close current through this circuit is strongly reduced owing to the fact that the voltage of the rectifiers in this circuit is reduced through regulating voltage arising over the control bridge K between the point 40 and 41. Upon the speech transmission from M2 to H1 part of the speech energy is conducted to the attenuation circuit D4, is amplified in the amplifier F23 and rectified in the rectifier bridge L2. The rectified voltage is fed to the control bridge K and causes the point 41 to have negative potential and the point 40 to have positive potential. Hereby a regulating current is generated, which passes the following circuit: the point 40—the rectifiers in D2—the connection 27—the rectifiers in D3—the point 41. As a result, the attenuation circuit D2 will not be much attenuating, the attenuation circuit D3 will be strongly attenuating and also the attenuation circuit D1 will be strongly attenuating as the close current through this circuit is strongly reduced owing to the fact that the voltage of the rectifiers is reduced through the regulating voltage arising over the control bridge K between the points 41 and 40.

With the amplifier arrangement according to the invention it is possible to use the principle of speech control in noisy rooms without at the same time totally blocking the speech direction in the rest position, since the balanced connection of the close current circuit to the working current circuit permits use of the close current source regulated for generating close current to the attenuation circuit D1 and D2 during the active periods of the amplifier arrangement for indirectly controlling the one of the attenuation circuits D1 and D2, which is included in the transmission channel of the speech direction not used at the moment.

I claim:

An amplifying control system for a loudspeaking telephone instrument including a microphone and a loudspeaker, said system comprising, in combination, a first amplifier for amplifying speech currents outgoing from said microphone and fed to the input side of said amplifier; a second amplifier for amplifying incoming speech currents fed to said loudspeaker; a first attenuation network including non-linear circuit components for controlling the amplification of the outgoing speech currents and strongly attenuating the same when speech currents are supplied to the second amplifier causing said amplifier to operate; a second attenuation network including non-linear circuit components for controlling the amplification of incoming speech currents supplied to the second amplifier and strongly attenuating said currents when the first amplifier is operating; a third attenuation network including non-linear circuit components connected in parallel to the input side of the first attenuation network and weakly attenuating in the absence of incoming speech currents supplied to the second amplifier; a fourth attenuation network including non-linear circuit components connected in parallel to the input side of the second attenuation network and weakly attenuating in the absence of speech current fed to the first amplifier, said first and second attenuation networks being alike and changing from strong attenuation to weak attenuation when non-linear components included in said networks are current conducting, and said third and fourth attenuating networks being alike and changing from weak attenuation to strong attenuation when non-linear circuit components included in said networks are current conducting; control circuit means including a four-arm bridge circuit for generating a current depending upon voltage fed to the bridge circuit through said third and fourth attenuation networks, a closed circuit including a source of current having a high inner resistance, said closed circuit being connected in series with the non-linear circuit components of the first and second attenuation networks for feeding the same current to said non-linear circuit components, and a connecting circuit means having two branches connected in series with the non-linear components of the third and fourth attenuation networks, one of said branches being connected to a junction point of two bridge arms, the diagonally opposite junction point of the bridge being connected to a point which is electrically symmetric in respect to the high inner resistance of said source of current and the other of said branches being connected to a point which in said closed current circuit is electrically symmetric in respect to said inner resistance.

References Cited in the file of this patent

UNITED STATES PATENTS 2,820,108 Kass ------------------ Jan. 14, 1958

FOREIGN PATENTS 415,173 Great Britain ---------- Aug. 23, 1934